United States Patent [19]

Jordan, Jr.

[11] 4,329,574
[45] May 11, 1982

[54] BAR CODE CANDIDATE SELECT CIRCUIT

[75] Inventor: Alex Jordan, Jr., Raleigh, N.C.

[73] Assignee: International Business Machines Corp., Armonk, N.Y.

[21] Appl. No.: 162,978

[22] Filed: Jun. 25, 1980

[51] Int. Cl.³ .............................................. G06K 7/10
[52] U.S. Cl. .............................. 235/463; 340/146.3 Z; 235/466
[58] Field of Search ............... 235/463, 449, 466, 470, 235/454; 340/146.3 Z, 146.3 F; 364/490

[56] References Cited

U.S. PATENT DOCUMENTS

| | | | |
|---|---|---|---|
| 3,770,944 | 11/1973 | Schanne et al. | 235/454 |
| 4,074,114 | 2/1978 | Dobras | 340/146.3 F |
| 4,075,461 | 2/1978 | Wu et al. | 235/466 |
| 4,104,514 | 8/1978 | Sherer et al. | 340/146.3 Z |
| 4,163,212 | 7/1979 | Buerger et al. | 364/490 |
| 4,182,481 | 1/1980 | Maussion | 235/449 |
| 4,253,018 | 2/1981 | Amacher et al. | 235/463 |

*Primary Examiner*—Donald J. Yusko
*Attorney, Agent, or Firm*—Gerald R. Woods

[57] ABSTRACT

A bar code label candidate is framed in a stream of scanner-generated data by a circuit which counts the width of each pulse and which accumulates a fixed number of pulse width values on a rolling basis to provide overlapping basic unit signals. Each basic unit signal represents a potential N-pulse character. Basic unit signals occurring at N intervals are compared in a comparator circuit to determine whether predetermined character-indicating relationships exist. Character-indicating signals are accumulated in registers. Outputs from these registers are decoded to determine whether a label candidate (appropriate type and number of apparent characters in appropriate time sequence) has been found.

10 Claims, 9 Drawing Figures

BAR CODE CANDIDATE SELECT CIRCUIT

TECHNICAL FIELD

The present invention relates to bar code scanners and more particularly to a circuit for identifying a potential label or label candidate in a stream of raw data provided by a scanner.

PRIOR ART

A significant problem in scanning randomly oriented bar code labels, such as Universal Product Code (UPC) labels on grocery products, is locating or identifying the label. The box or container on which the label appears will generally have a relatively large amount of printed matter adjacent the label. When the scanner beam traverses the printed matter, code-like signals will be generated by the scanner. All of the signals presented by the scanner must be analyzed to determine which represent bar code label signals and which represent extraneous background signals.

One known technique for isolating label signals from extraneous background signals is that disclosed and claimed in U.S. Pat. No. 3,909,787. In the candidate select processor described in that patent, raw scanner data is thresholded and squared in a data preprocessor circuit to produce a train of square wave pulses in which the duration of each pulse represents the duration of a dark or light segment on the surface being scanned. Where scanner beams are actually traversing a bar coded label, the width of the square wave pulses are directly proportional to the width of the bars and spaced in the label. Four separate pulse trains are generated from the scanner output with each pulse train being delayed relative to the preceding train by one pulse width. The four pulse trains are distributed and examined concurrently in four separate and independent logic circuits. The logic circuits test for the existence of predetermined relationship between adjacent, non-overlapping N-pulse characters in a pulse train. When any one of the four circuits locates a label candidate, a framing signal is generated which is used to initiate a transfer of the data from a parallel buffer memory to a processor. Decoding operations are performed in the processor.

While the circuit performs its intended function quite satisfactorily, it is undesirably complex since it must have found substantially identical logic circuits for concurrently examining the four separate data streams.

SUMMARY OF THE INVENTION

The present invention is a bar code candidate selection circuit which is less complex than the known prior art circuit.

A circuit constructed in accordance with the present invention is capable of generating a framing signal for a label having C characters where each character consists of N successive pulses. The apparatus includes a pulse width counter for measuring the width of each pulse in a scanner-generated train of pulses as a function of a number of constant frequency counts occurring between the leading and trailing edges of the pulse. The pulse width counts are applied to an accumulator circuit which generates a stream of basic unit signals. Each of the basic unit signals has a value proportional to the combined duration of N successive pulses beginning at a different pulse in the train. The output of the accumulator circuit is supplied to a subtractor circuit which compares two basic unit signals which are N signals apart in the stream of basic unit signals. The subtractor circuit generates an absolute difference signal and a carry signal. The apparatus includes comparators for comparing predetermined fractions of one of the two signals with the absolute difference. The apparatus further includes means for storing the signals generated in the comparator circuit in a predetermined sequence during examination of N×C successive basic unit signals. The apparatus further includes means for logically combining selected outputs from the storage means to produce a framing signal in response to a predetermined pattern of stored signals concurrently appearing at selected outputs from the storage means.

BRIEF DESCRIPTION OF THE DRAWINGS

While the specification concludes with claims particularly pointing out and distinctly claiming that which is regarded as the present invention, the details of a preferred embodiment of the invention may be more readily ascertained from the following technical description when read in conjunction with the accompanying drawings wherein:

TECHNICAL DESCRIPTION

Figure 1:
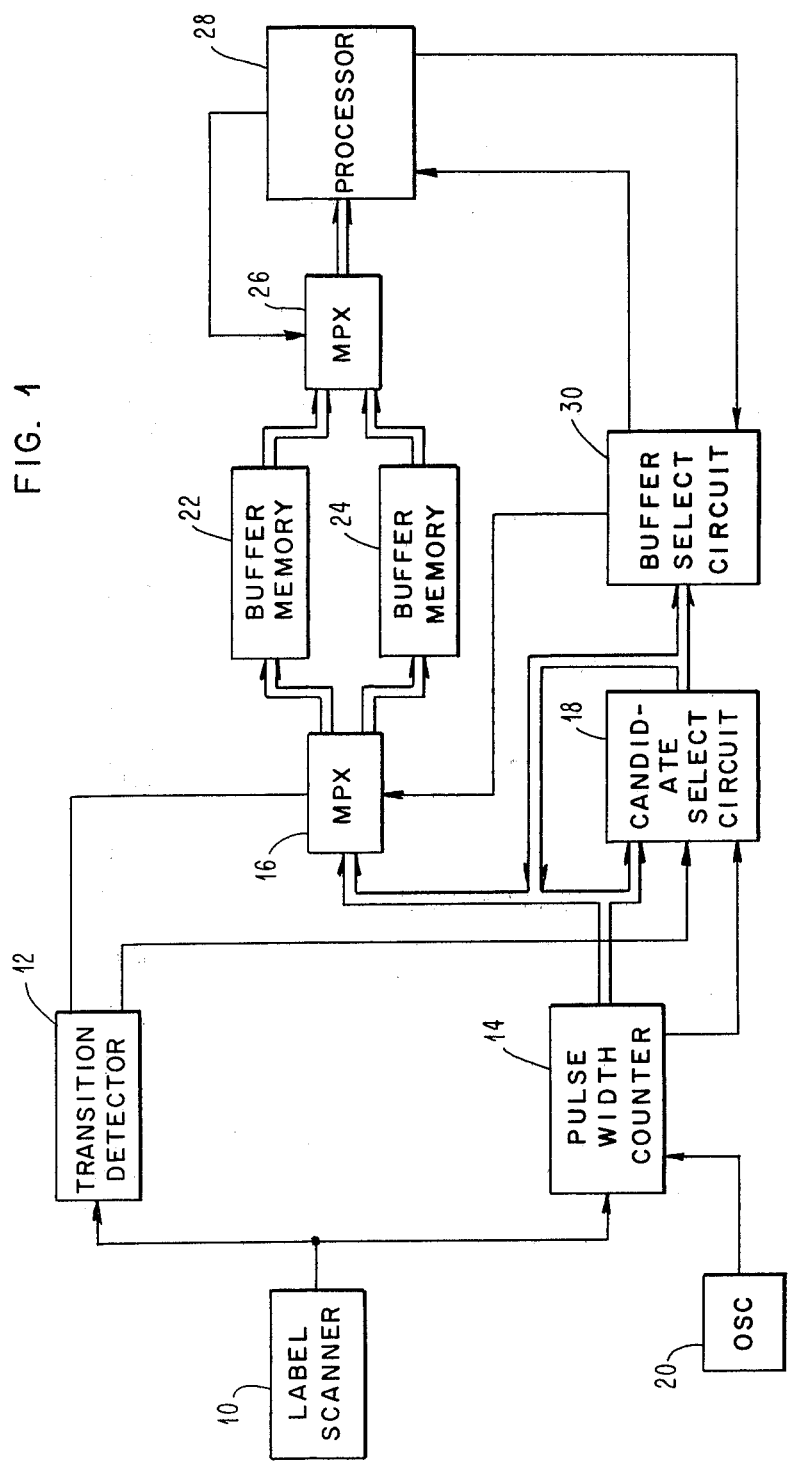
FIG. 1 is a simplified block diagram of a label reading system including a candidate select circuit constructed in accordance with the present invention.

Referring to FIG. 1, one type of label reading system in which the present invention may be used would include a label scanner 10 for detecting optical or magnetic indicia on a surface being scanned. As a matter of convenience, it will be assumed that scanner 10 is an optical scanner which provides a sinusoidal signal having an amplitude which varies inversely to the reflectance of the portion of the surface being scanned. Label scanner 10 is assumed to include threshold and signal-shaping circuits which convert the sinusoidal signal to a square wave pulse train in which each pulse has a duration determined by the length of a light or dark area being scanned. The output of label scanner 10 is applied to a transition detector 12 and to a pulse width counter 14. Transition detector 12 provides a brief pulse at the leading edge at each positive and negative pulse in the square wave pulse train. The pulses are used for timing the transfer of data through a 1 to 2 parallel multiplexer 16 and a candidate select circuit 18, which will be described in more detail later.

The function of the pulse width counter 14 is to measure the width of each positive (bar) and negative (space) pulse in the square wave pulse train generated by scanner 10. Pulse width counter 14 may be a conventional counter which is driven by a constant frequency oscillator 20. The oscillator output is used to increment one or more counter devices with each counter being gated on at the leading edge of a pulse and gated off at the trailing edge of the pulse. The accumulated count is proportional to the duration of the pulse. The output of pulse width counter 14 is a multi-bit signal or word which is presented in parallel both to the multiplexer 16 and to the candidate select circuit 18. Pulse width words are shifted through multiplexer 16 and candidate select circuit 18 in synchronism. At any given time, multiplexer 16 delivers pulse width words to one of two parallel buffer memories 22, 24. Concurrently, the contents of the other buffer are transferred through a 2 to 1 parallel demultiplexer 26 to a processor 28. The data transfer into and out of the buffer memory 22 and 24 is under the control of a buffer select circuit 30. The details of the buffer memories and multiplexer circuits are not essential to an understanding of the present invention and are not described in this specification.

The function of a candidate select circuit constructed in accordance with the present invention is to recognize pulse patterns which might represent labels in the train of pulses generated by label scanner 10. When an apparatus label or label candidate is detected in candidate select circuit 18, a framing signal or character is generated. The framing signal is merged with the stream of pulse width words transmitted to multiplexer 16 from pulse width counter 14 to locate or frame the label candidate data in this stream. The framing signal is also applied to buffer select circuit 30, for use in controlling the connections between multiplexer 16 and the buffer memories 22 and 24.

Figure 2:
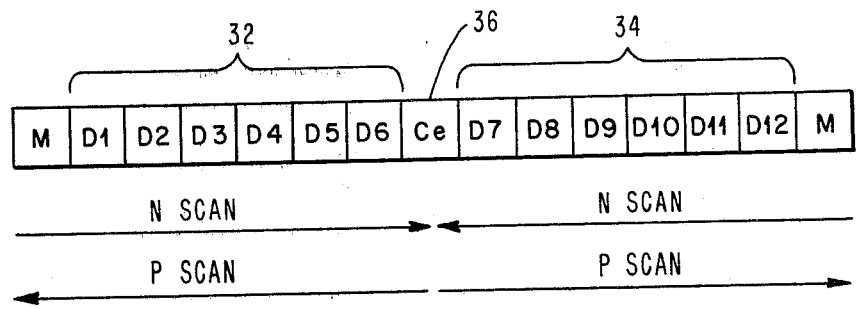
FIG. 2 is a schematic layout of one type of UPC label showing the relative locations of different types of characters in the label.

FIG. 2 depicts one type of label which might be recognized by a candidate select circuit constructed in accordance with the present invention. The label includes twelve bar-coded data characters D1–D12 segregated into a left hand set 32 and a right hand set 34. The data characters represent numeric values in the range 0–9. The left and right hand sets 32 and 34 are separated by center character 36. Center character 36 has no numeric value but serves to delimit the data character sets and to provide information needed to establish the direction in which the label is scanned. Margin characters 38 and 40 are provided at the left and right ends of the label. The margin characters are also used as data character delimiters and to establish scan direction.

As a matter of convention, any scan which begins at a margin character and extends at least to the center character is defined as an N scan. Any scan which extends from the center character to one of the margin characters is defined as a P scan.

Figure 3:
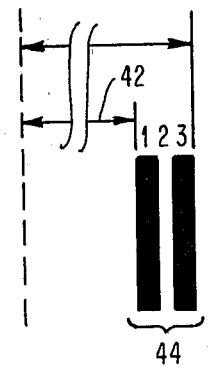
FIG. 3 depicts the guard bar or margin character used in the UPC label.

Referring to FIG. 3, the UPC margin character includes an indefinitely wide light space 42 between adjacent printed matter and a bar-space-bar combination 44. The bars and space in combination 44 will be of the same width. The actual width will vary as a function of the overall label size. For purposes of decoding the label, it can be said that each bar and each space is one module wide. No maximum acceptable width is specified for light space 42. A minimum acceptable width of 5 modules is established by UPC standards.

Conventionally, the margin character is considered to be the bar-space-bar combination 44. As will be explained in more detail later, a candidate select circuit constructed in accordance with the present invention assumes a margin character consisting of the combination 44 plus the indefinitely wide space 42.

Figure 4:
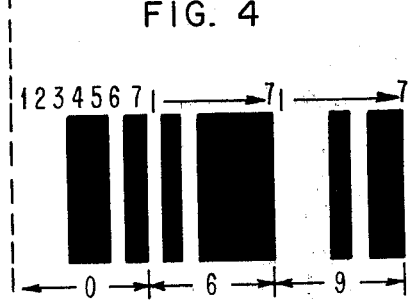
FIG. 4 depicts three sequential UPC data characters.

Each data character in the Universal Product Code is made up of two bars and two alternating spaces. In a given label, every data character has the same physical width. Expressed in terms of modules, each data character is seven modules wide. Individual bars may be one to four modules in width while individual spaces may be one to three modules in width. FIG. 4 illustrates UPC characters for the numeric values 0, 6, 9 as those characters are represented in the left hand set of data characters. If a space is characterized as a 0 and a bar as a 1, the binary representation for the seven module data character "0" would be 0001101. Similarly, the binary representation for a symbol representing the number 6 would be 0101111.

If the symbol for a particular number is to be included in the right hand set 34 of the label, the printed symbol is the binary complement of the corresponding symbol in the left hand set. That is, the symbol for the number 0 would be 1110010.

It should be noted that a given data character which is swept in an N scan begins with a space and ends with a bar. If the same character is scanned in a P scan direction, it appears to begin with a bar and end with a space. This apparent character inversion as a function of the type of scan is taken into account in examining the data within the candidate select circuit 18. The way in which it is taken into account is described in more detail later.

Figure 5:
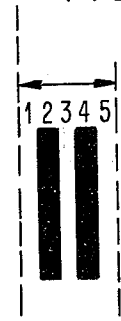
FIG. 5 depicts a UPC center character.

FIG. 5 shows the UPC center character structure. The center character includes three spaces and two interleaved bars. All of the bars and spaces have a standardized width of one module. For purposes of candidate selection, the last space in the direction of scan is ignored in the candidate select circuit using the present invention. That is, if the center character were being scanned from left to right, the candidate select circuit would make use only of spaces 1 and 3 and bars 2 and 4 in the center character.

Figure 6:
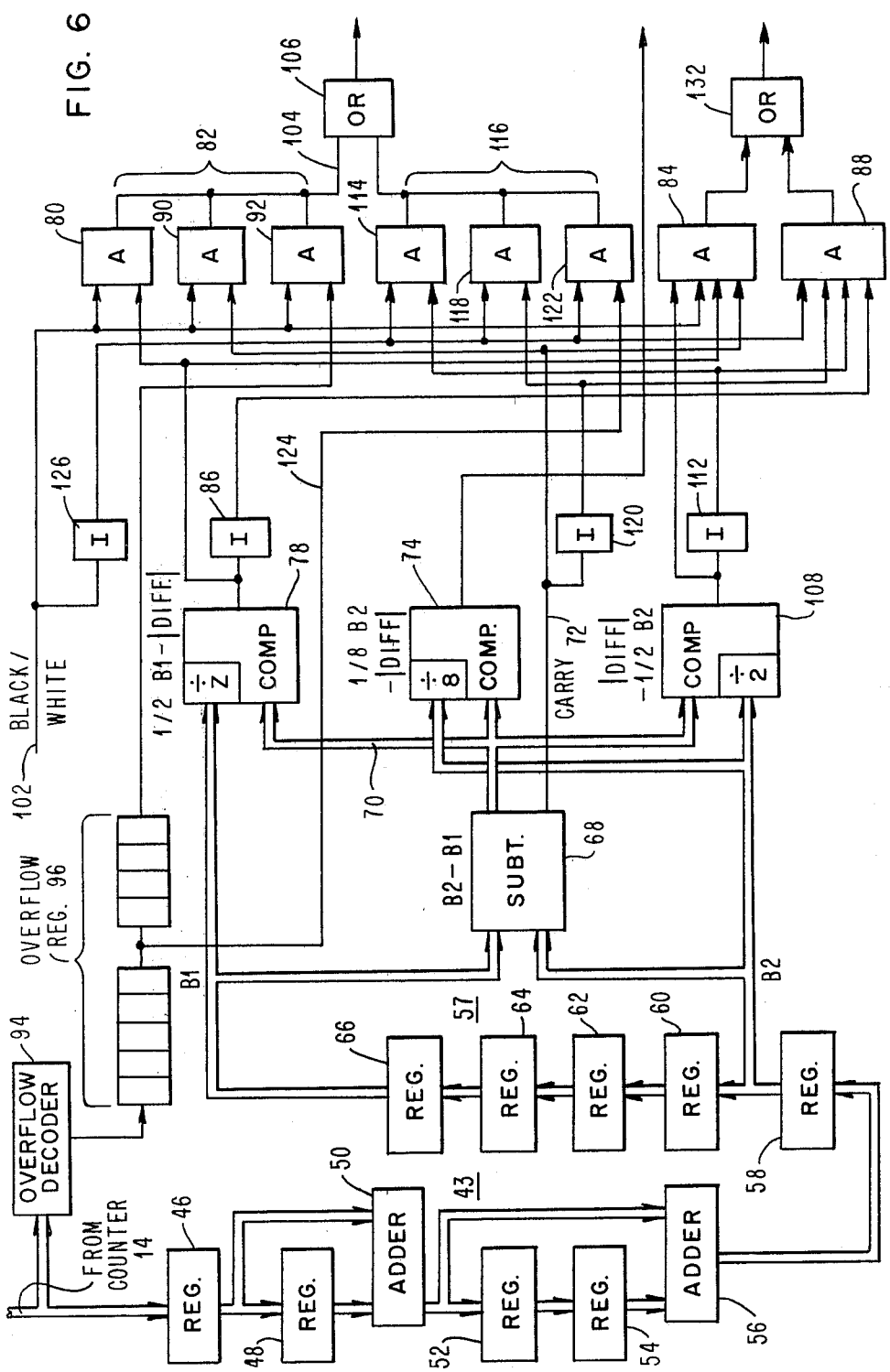
FIG. 6 is a schematic diagram of one portion of a candidate select circuit constructed in accordance with the present invention.

FIG. 6 is a more detailed block diagram of the candidate select circuit shown as box 18 in FIG. 1. Each binary pulse width word generated in pulse width counter 14 is presented in parallel to an accumulator circuit 43 having a first pair of parallel input/output shift registers 46 and 48, a first adder circuit 50, a second pair of parallel input/output shift registers 52 and 54 and a second adder circuit 56. The outputs of registers 46 and 48 are applied in parallel to the adder circuit 50. The output of adder 50 is applied to adder 56 in parallel with the output of register 54. The function of accumulator circuit 43 is to sum the valve of four successive pulse width words provided by pulse width counter 14. The summing is performed on a rolling, overlapping basis. That is, if the letters ABCDEFG represent successive pulse width words generated by counter 14, the output of adder circuit 56 will consist of the following combinations of these words: ABCD, BCDE, CDEF, DEFG, etc.

In terms of label structure, the output of the accumulator circuit 43 represents all of the possible characters which might be formed by any combination of four adjacent bars and spaces. Although successive outputs from accumulator circuit 43 overlap (i.e., share several of the same bars and/or spaces) the actual printed label characters are physically independent of one another and cannot overlap. Before necessary character-tocharacter comparisons can be performed, the output of the accumulator circuit must be operated on to provide two simultaneous outputs representing contiguous but non-overlapping characters. This function is performed by a circuit including five parallel input/output shift registers 58, 60, 62, 64 and 66 which form a five stage parallel input/output shift register chain 57. The outputs of the last shift register 66 and the first shift register 58 in the chain 57 are compared with one another in the remainder of the circuit to determine whether predetermined relationships exist. From time to time, the output of register 66 may be referred to as a basic unit 1 or B1 signal while the output of register 58 may be referred to as a basic unit 2 or B2 signal.

Figure 7:
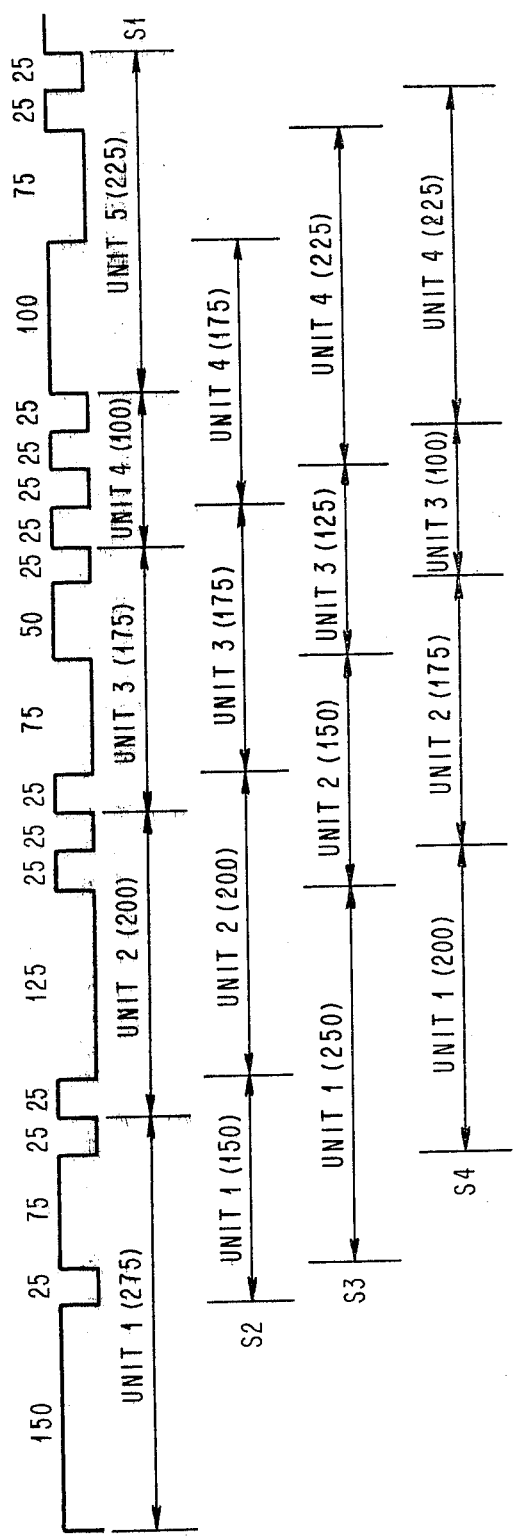
FIG. 7 is a graph of a square wave pulse train and of the stream of basic unit signals which are generated by processing the train in an accumulator circuit described with reference to FIG. 6.

The operations performed by the accumulator circuit 43 and the register chain 57 are represented in FIG. 7. The square wave pulse train shown there is representative of the type of pulse train which might be generated by label scanner 10. The decimal values appearing above the individual pulses are the decimal equivalents of binary values which would be generated by pulse width counter 14. The decimal values have been assigned strictly as a matter of convenience. In practice, the number of counts per pulse would be much higher than the illustrated numbers. Each of the count values would be applied in succession to the input of accumulator circuit 43. The output of adder 56 in that circuit represents the sum of four successive counts. The first output of adder 56 would be a count of 275 representing unit 1 in data stream S1. The next output from adder circuit 56 would be a count of 150 representing unit 1 in data stream S2. The third output of adder circuit 56 would be a count of 250 (unit 1 in data stream S3) while the fourth output would be a count of 200 representing unit 1 in data stream S4. The fifth output (and every fourth output thereafter) represents a contiguous, non-overlapping basic unit in data stream S1. Similarly, each of the remaining data streams S2, S3 and S4 consists of basic units occurring at every fourth output from the adder circuit 56. The resulting inputs to the chain 57 can be described as four interleaved data streams, only one of which actually represents the label structure. The register chain 57 "unscrambles" the interleaved data streams so that the remainder of the candidate select logic circuit is able to compare successive non-overlapping basic units in each of the data streams. For example, the first comparison operation would be between units 1 and 2 in stream 1. The second comparison operation would be between units 1 and 2 in stream 2 while the third and fourth comparison operations would involve corresponding units in streams S3 and S4. The fifth comparison operation would involve units 2 and 3 in data stream S1. As will be explained in more detail later, test results for contiguous units in each of the four data streams are recorded independently when a label candidate is found. The recorded test results indicate which of the data streams is actually representative of the scanned label.

Referring again to FIG. 6, basic unit signals B1 and B2 are applied to a subtractor circuit 68 which generates a first multibit signal word on bus 70 representing the absolute difference between B1 and B2. The subtractor circuit 68 also produces a carry signal on line 72. If B1 is greater than B2, line 72 carries a + or binary 1 signal. If B2 is greater than B1, line 72 carries a minus or binary 0 signal. The absolute difference signal appearing on bus 70 is applied to a first comparator circuit 74. The B2 signal is applied to a second input of comparator 74.

The magnitude of the B2 input is scaled down by a factor of 8 within comparator 74 by the conventional expedient of shifting the most significant bit of B2 three places relative to the most significant bit of the absolute difference signal on bus 70. The comparator 74 determines whether $\frac{1}{8}$ B2 is greater than the absolute difference between B1 and B2. A positive output from the comparator is an indication that the values of B1 and B2 are substantially equal and therefore might be data characters in the UPC label.

Figure 8:
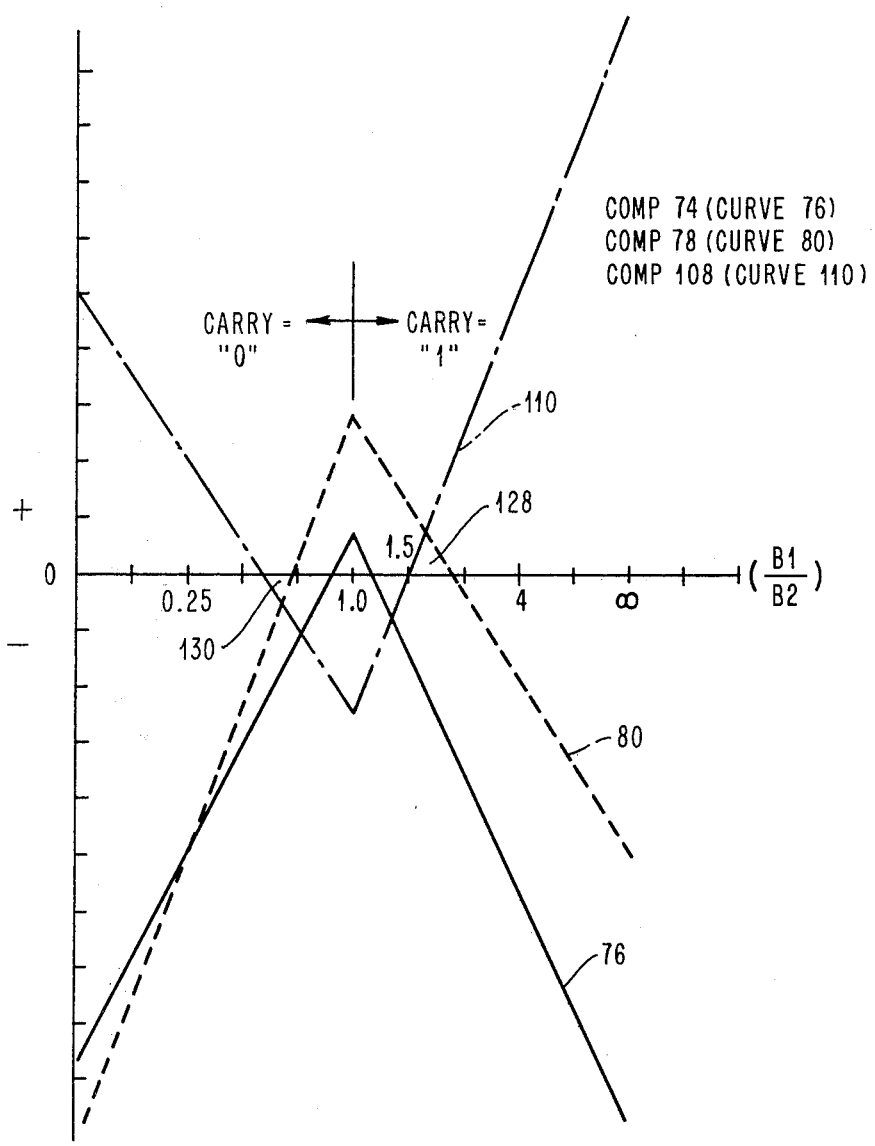
FIG. 8 is a graph of response of comparator devices in the circuit shown in FIG. 6.

Referring momentarily to FIG. 8, the inverted V-shaped curve 76 shows the response of the comparator 74 as a function of the ratio (B1/B2). The curve 76 shows that the output of comparator 74 is positive (binary 1) only when $0.875 < B1/B2 < 1.125$. For smaller or larger ratios of B1 to B2, the comparator 74 output is a minus or binary 0.

The B1 signal is scaled down by a factor of 2 at one input to a comparator circuit 78. The second input to comparator 78 is the absolute difference signal appearing on bus 70. Comparator 78 is one component in combination of logic elements which test for a possible margin-data character relationship between the B1 and B2 signals during an N-type scan. Referring briefly back to FIGS. 3 and 4, a data character in a UPC label is always seven modules wide with the modules being allocated between two bars and two spaces. Conventionally, a data character is referred to as having a normalized width of seven. The normalized width of a margin or guard bar character has been conventionally regarded as three; that is, two single-module bars and one single-module space. For purposes of this invention, the indefinite white space 42 outside of the conventional margin character 44 is considered to be part of the margin character. UPC standards require that space 42 be at least five modules in width, giving the margin character a minimum normalized width of 8. A successful margin/data character test is possible only if B1/B2 is greater than or equal to 8/7.

By solving the equation $\frac{1}{2}B1 - |B1 - B2| = 0$, it can be found that the condition for which comparator 78 actually tests is $\frac{2}{3} < B1/B2 < 2$. If the ratio B1/B2 is within these limits, the output of comparator 78 is a positive or binary 1 signal. Assuming B2 has a normalized width of seven, this means the comparator 78 output is positive for normalized values of B1 in the range of 4.67 to 14. Curve 80 in FIG. 8 depicts the response of comparator 70 in the region of interest. The lower limit of the positive output range of comparator 78 is less than the minimum ideal margin/data character ratio of 8 to 7 for a reason. As will be explained in more detail later, the reduced lower limit permits the comparator 78 output to be used in testing for a possible center character in both N-type and P-type scans.

The output of comparator 78 is applied both to a dual input And gate 80 in a first set 82 of parallel And gates and to a first quad input And gate 84. The output of comparator 78 is also inverted by a conventional inverter amplifier 86, the output of which is connected to a second quad input And gate 88.

One input to an And gate 90 in set 82 is provided by a direct connection to the carry output 72 from subtractor circuit 68. One input to a third And gate 92 in set 82 is provided by a counter overflow register 96 associated with pulse width counter 14. Since the size of the UPC label is small relative to the size of the surface on which it is carried, it can be expected that the surface will have non-label white spaces or bars which have a count length exceeding the finite count capacity of the pulse width counter 14. This is referred to as an overflow condition. Counter 14 will begin to count from 0 once it has exceeded its capacity. Unless the overflow condition is detected and recorded, the output of the counter might be erroneously interpreted as indicating a relatively narrow bar or space when in fact, a considerably wider bar or space was being scanned. An overflow decoder circuit 94 provides a binary 1 signal whenever pulse width counter 14 reaches an overflow condition. This overflow bit is shifted through overflow register 96 in synchronism with the shifting of pulse width words through accumulator circuit 43 and parallel shift register chain 57. Overflow register 96 may be considered to be a nine stage serial shift register with output taps at the last stage and between the fifth and sixth stages. Any overflow signal generated for a particular pulse width word will reach the outputs from the overflow register at the same time that word reaches the B2 and B1 outputs from the register chain 57. Output 98 from overflow register 96 is applied to one input of And gate 92.

The function of the And gates in set 82 is to detect the various ratios of B1 to B2 which might indicate a margin-data character pair during an N type scan. During an N type scan, margin characters and data characters always end in a black bar. Therefore, the test for a margin-data character pair during an N type scan must be performed when the compared pair of basic unit signals end with bars, i.e., during black bar signals. A black-white input lead 102, connected to the transition detector 12 (FIG. 1), is applied to each of the And gates in set 82 to partially enable those gates at the same time. The black bar signal on lead 102 is also applied to the quad input And gate 84. Each of the different And gates in set 82 tests for a specific condition which might indicate that a margin-data character pair. And gate 80 provides a binary 1 output only where a $0.67 < B1/B2 < 2.00$. As discussed earlier, a potential margin-data character pair is indicated by a positive comparator output during the upper half of the range. And gate 90 produces a positive or binary 1 output whenever the signal on carry output 72 indicates that the B1 (potential margin) signal is equal to or greater than the B2 (potential first data character) signal. Finally, And gate 100 produces a binary 1 signal whenever the overflow register 96 indicates that pulse width counter 14, in attempting to establish the value of B1, has actually counted through its maximum capacity. The outputs of the And gates 80, 90, 100, have a common connection 104 to an OR gate 106.

A test for a valid data character/margin relationship between successive basic unit signals during a P-type scan is performed in part by a comparator 108. During a P-type scan, basic unit signal B1 would represent the potential data character adjacent the margin while basic unit signal B2 would represent the potential margin character. Comparator 108 compares the absolute difference of B1 and B2 to a signal equal to ½ of B2. Curve 110 represents the response of comparator 108 for various ratios of B1 to B2. The output of comparator 108 is applied directly to quad input And gate 84 and to an inverter 112. The inverted signal at the output of inverter 112 is applied both to quad input And gate 88 and to one input of an And gate 114 in a second set 116 of such gates. A second And gate 118 in the set 116 receives an inverted carry input from a conventional inverter amplifier 120 in series in bus 72. The third And gate 122 in the set 116 is connected to overflow register 96. If the pulse width counter 14 overflows in counting any of the pulses making up the basic signal B2, line 124 carries a binary 1 signal. A second input to each of the And gates 114, 118, 122 is provided by an inverter amplifier 126, the input to which is connected to the black-white signal line 102.

During a P-type scan, the last modular unit in a data character or margin character will be a white space. To test for the presence of margin and data characters during such a scan, the black-white signal on lead 102 is inverted so as to at least partially enable the And gates in set 116 during each white space. The And gate in the sets 116 perform functions similar to those performed by the And gate set 82. By solving the equation $|B1 - B2| - \frac{1}{2}B2 = 0$, it can be seen that the output of comparator 108 is negative only where $0.5 < B1/B2 < 1.5$. Assuming that B1, which represents the last data character prior to the margin in a P-type scan, has a normalized width of seven, And gate 114 will produce a binary 1 at its output when the B2 signal (representing the potential margin character) is greater than 4.67 and less than 14 units in normalized width. And gate 118 will produce a binary 1 signal when B2 is greater than B1. Finally, And gate 122 will produce a binary 1 signal if the overflow register 96 indicates that the pulse width counter 14 reached an overflow condition when counting one of the pulses in the B2 signal.

Quad input And gate 84 is used to test for a potentially valid data character-center character combination during an N-type scan. The inputs to quad input And gate 84 are the black-white signal on line 102, the comparator 78 output signal, the comparator 108 output signal and the carry signal on line 72. The signal on line 102 is high during the scan of each black bar. Referring briefly to FIG. 8, the output of comparators 78 and 108 are both positive for a narrow range of B1/B2 ratios. The range is defined by a small triangular area 128. The limits of the range are defined by the term $1.5 < B1/B2 < 2.0$. In an N-type scan, the normalized width of B1, representing the last data character before the center character, would have a value of seven. Referring briefly to FIG. 5, the UPC center character is conventionally regarded as having a normalized width of five, consisting of three single module spaces and two single module bars. For purposes of the present invention, the last space in the direction of this scan is ignored giving the center character a normalized width of four. Assuming a normalized B1 value of seven, the conditions defined by triangular area 128 are satisfied whenever $3.50 < B2 < 4.67$. This narrow range of B2 values is roughly centered on the optimal normalized value of 4.0 for a center character during an N type scan.

Quad input And gate 88 tests for a valid center character-data character combination during a P-type scan. During such a scan, a potential center character would be represented by the B1 signal while the potential adjacent data character would be represented by the B2 signal. The quad input And gate 88 receives inverted forms of the same four signals applied to the previously discussed quad input And gate 84. The And gate 88 tests for the simultaneous occurrence of a white bar signal on line 102, a carry=0 signal and 0 outputs from comparators 78 and 108.

Referring to FIG. 8, these conditions are satisfied only in the narrow range of B1/B2 values defined by a triangular area 130. In a P-type scan, the normalized width of a valid data character is equal to seven. In a P-type scan, the B2 signal represents the data character. If B2 is equal to seven, then $3.50 < B1 < 4.67$ in order to satisfy the conditions defined by the triangular area 130. As discussed earlier with reference to quad input And gate 84, this range is centered on the optimum 4.0 normalized width of the four-element center character utilized in practicing the invention.

The outputs of And gates 84 and 88 are combined in a single OR gate 132.

Figure 9:
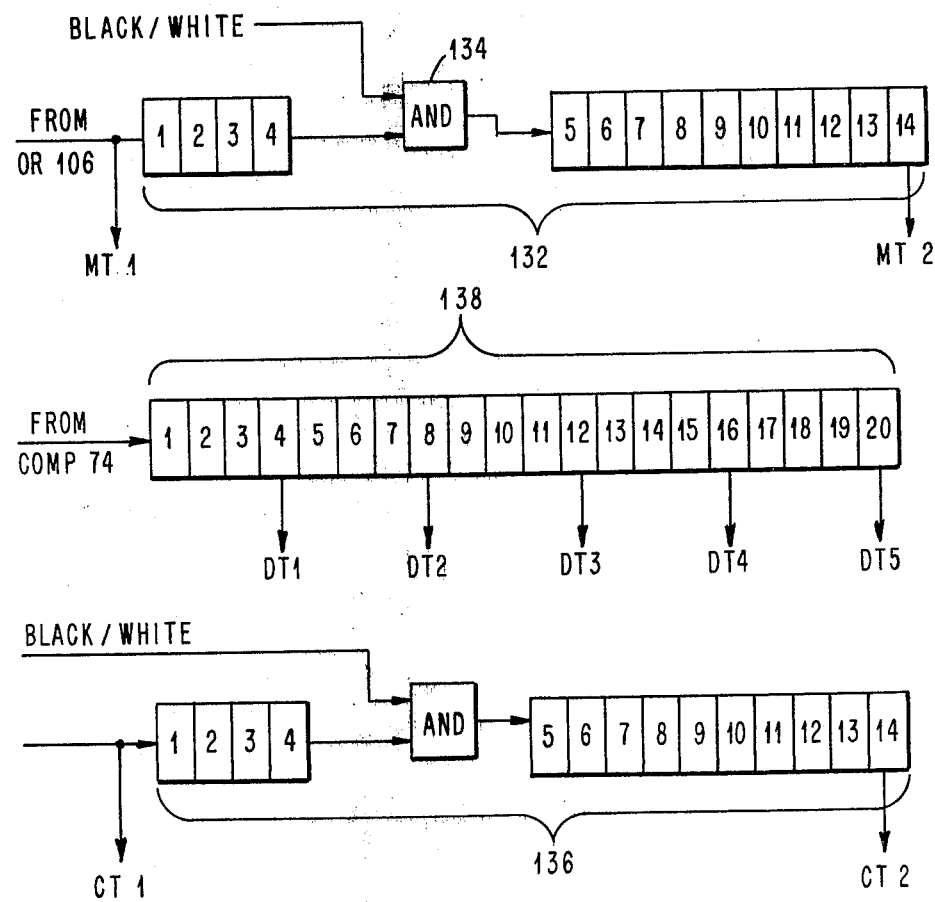
FIG. 9 is a schematic diagram of storage registers and decoding elements connected to outputs from the circuit shown in FIG. 6.

When a UPC label is scanned, the data is examined for ½ of the label (margin through center) at any one time. A half label will consist of 32 sequential pulses on which 25 tests must be performed in order to determine whether a valid label candidate exists. FIG. 9 is a schematic diagram of the registers which are used to store the results of all 25 tests. The output of margin-testing OR gate 106 is connected to the first stage of a split shift register 132. An MT1 tap exists at the OR gate output. The results of both P and N scan tests are shifted in series through the first four stages of the split shift register. The output of the fourth stage is applied to an And gate 134, a second input to which is provided by the black/white signal line 102 (FIG. 6). The And gate 134 is enabled upon occurrence of each black bar signal to pass the results of N-scan tests only. The results of P-type scan tests are lost at this point in the shift register. The loss of the P-type scan test data is unimportant since a valid margin test can occur only at the end and not at the beginning of a P-type scan. A valid margin test for an N-type scan would be indicated by a binary 1 at stage 14 of the split shift register 132; that is, at the MT2 line.

An identical shift register 136 can be used to store the results of center character tests. For a P-type scan, the center character test would be the first test to be performed by circuitry associated OR gate 132 and thus the oldest test to be stored in the register 136. A binary 1 at the CT2 tap at stage 14 of register 136 would indicate a valid center character test during a P-type scan. Conversely, a binary 1 at the CT1 tap indicates a valid center character test for an N-type scan.

The results of both P-type and N-type scans must be stored for potential data characters. These test results are stored in a conventional serial shift register 138 having 20 stages. Every fourth stage contains a data test tap. In practice, the presence or absence of successful data tests are indicated by tests 5, 9, 13, 17 and 21 of a 32 pulse data stream. The first test is considered to be "stored" directly at the output of comparator 74 so that the result of test 5 is actually stored in register stage 4, the result of test 9 is actually stored in register stage 8, etc.

The various taps from the registers 132, 136 and 138 are logically combined at And gates 140 and 142. A binary 1 output from And gate 140 indicates that 32 pulses just tested represent a label candidate or frame for an N-type scan. Similarly, binary 1 output from And gate 142 indicates a label condidate or frame for a P-type scan. As discussed earlier, the frame signal is applied to buffer select circuit 30 and is appended to the data stream entering multiplexer 16 to define the location of the label frame.

While there has been described what is considered to be a preferred embodiment of the present invention, it is obvious that variations and modifications therein will occur to those skilled in the art once they become acquainted with the basic concepts of the invention. Therefore, it is intended that the appended claims shall be construed to include not only the preferred embodiment but all such variations and modifications as fall within the true spirit and scope of the invention.

Having thus described my invention with reference to a preferred embodiment thereof, what I desire to secure by Letters Patent is:

1. For use with a scanner capable of generating a train of square wave pulses indicative of bar coded indicia on a surface being scanned, apparatus for generating a framing signal for a label having C characters where each character consists of N successive pulses, said apparatus comprising:

a pulse width counter for measuring the width of each pulse in the train as a function of the number of constant frequency pulses occurring between the leading and trailing edge of the pulse;

an accumulator circuit connected to the output of said pulse width counter for generating a stream of basic unit signals, each of said signals having a value proportional to the combined duration of N successive pulses beginning at a different pulse in the train;

a subtractor circuit having first and second inputs from said accumulator circuit for subtracting a second basic unit signal from a first, contiguous non-overlapping basic unit signal, said subtractor circuit having an absolute difference output and a carry output, the carry output having a first value when the first basic unit signal is greater than the second basic unit signal and a second value when the second basic unit signal is greater than the first basic unit signal;

a comparator circuit having inputs from said subtractor circuit and said accumulator circuit for determining whether predetermined relationships exist between two non-sequential basic unit signals representing contiguous, non-overlapping characters, said comparator circuit further including:

a first comparator for generating a first type of output signal only when the absolute difference output is less than a first predetermined fraction of one of the compared basic unit signals, a second comparator for generating a first type of output signal only when the absolute difference is less than a second predetermined fraction of the first of the compared basic unit signals, and a third comparator for generating a first type of output signal only when the absolute difference is greater than the second predetermined fraction of the second of the compared basic unit signals;

means for storing the signals generated by said comparator circuit during the examination of (N×C) successive basic unit signals; and means for logically combining selected outputs from said storage means to produce a framing signal when a first type of output signal appears concurrently at the selected outputs from said storage means.

2. An apparatus as defined in claim 1 further including:

means for providing a scan direction signal in phase with the signals generated by the scanner;

an overflow latch connected to the accumulator circuit for indicating that the basic value of a given character exceeds an allowable limit;

a first set of coincidence elements connected to said scan direction means, said overflow latch and said subtractor circuit for providing a first margin character indicating signal if the scan direction signal has a first value while the first comparator produces a first output signal or while the carry output has a first value or while the overflow latch indicates that the first of the compared basic unit signals exceeds the allowable limit; and a second set of coincidence elements connected to said scan direction means, said overflow latch and said subtractor circuit for providing a second margin character indicating signal if the scan direction signal has a second value while the third comparator produces the first output or while the carry output has a second value or while the overflow latch indicates that the second of the compared basic unit signals has a value exceeding the allowable limit.

3. An apparatus as defined in claim 2, further including a center character testing circuit having inputs from scan direction means, said first comparator circuit, said third comparator circuit and from the carry output of said subtractor circuit, said center character testing circuit producing either a first output signal indicating the existence of an apparent center character or a second output signal indicating the absence of an apparent center character.

4. An apparatus as defined in claim 3, wherein said center character testing circuit further comprises:

a first coincidence element for producing a first type of output signal when the scan direction means, the first comparator, the third comparator and the carry output each provides a first level of input signal;

a second coincidence element for producing a first type of output signal when the scan direction means, the first comparator means, the third comparator and the carry output concurrently provide input signals having a second level; and an OR gate for combining the outputs from said first coincidence element and said second coincidence element.

5. A method of detecting a label candidate in the train of square wave pulses indicative of bar coded indicia on a surface being scanned where the label includes C characters, each consisting of N successive pulses, said method including the steps of:

generating a stream of basic unit signals, each having a value proportional to the combined duration of N-successive pulses beginning at a different pulse in the train;

subtracting a first basic unit signal from a second basic unit signal representing the contiguous non-overlapping basic unit signal to provide an absolute difference value and a carry value;

comparing the absolute difference value with a first predetermined fraction of one of the compared signals to generate a first level of output signal when the absolute difference value is the lesser;

comparing the absolute difference value with a second predetermined fraction of the first of the compared signals to generate a first level of output signal when the absolute difference value is the lesser; and comparing the absolute difference value with the second predetermined fraction of the second of the compared signals to generate the first level of output signal when the absolute difference value is the greater;

storing the signals generated as a result of each of the comparisons during the examination of $N \times C$ successive basic unit signals; and logically combining selected ones of the stored signals to produce a label candidate signal when all of the selected signals have the first level.

6. For use with a scanner capable of generating a train of square wave pulses indicative of bar-coded indicia on a surface being scanned, apparatus for generating a framing signal for identifying the location of pulses in the train potentially representing a label having a plurality of data characters delimited by a margin character and a center character, each of said characters consisting of N successive square wave pulses, said apparatus comprising:

means connected to the scanner for generating a series of basic unit signals, each of which has a value representative of the accumulated width of N successive square wave pulses, successive ones of said basic unit signals being generated from the start of successive square wave pulses;

data stream separating means connected to said basic unit signal generating means for presenting a pair of basic unit signals simultaneously on a pair of outputs, said pair of basic unit signals representing two potential contiguous N-pulse characters; and comparator means connected to said data stream separating means for comparing the relative widths of the basic unit signals in each presented pair to determine whether the relative widths fall within predetermined limits indicative of possible combinations of data, margin and center characters.

7. Apparatus as defined in claim 6, wherein said comparator means further comprises:

means for generating a signal representing the absolute difference of the values of the presented pair of basic unit signals;

a first comparator device connected to said data stream separating means and to said absolute difference signal generating means for determining whether the magnitude of a predetermined fraction of one of the presented basic unit signals is greater or less than the absolute difference signal, the output of said first comparator means being indicative of the presence or absence of adjacent potential data characters;

a second comparator device connected to said data stream separating means and to said absolute difference signal generating means for determining whether the magnitude of a predetermined fraction of the first of the presented basic unit signals is greater or less than the absolute difference signal, the output of said second comparator means being indicative of the presence or absence of a pair of adjacent potential margin and data characters; and a third comparator device connected to said data stream separating means and to said absolute difference signal generating means for determining whether the magnitude of the absolute difference signal is greater or less than the magnitude of a predetermined fraction of the second of the presented basic unit signals, the output of said third comparator means being indicative of the presence or absence of a pair of adjacent potential data and margin characters.

8. Apparatus as defined in claim 7 wherein said comparator means further includes logic means connected to said second and third comparator means for testing for the presence of potential, adjacent center and data characters.

9. Apparatus as defined in claim 8 further including:
storage means for storing a plurality of outputs from said comparator means, said storage means having separate storage devices for storing the separate outputs representing tests for potential margin-data character pairs, data-data character pairs and datacenter character pairs; and means for logically combining outputs from said separate storage devices to detect the presence of outputs representative of a plurality of potential data characters delimited by potential margin and center characters.

10. For use with a scanner capable of generating a train of square wave pulses indicative of bar-coded indicia on a surface being scanned, a method of deriving a framing signal for identifying the location of a sequence of square wave pulses potentially representing a label having a plurality of data characters delimited by a margin character and a center character, each of said characters being defined by N successive square wave pulses, said method including the steps of:

generating a series of basic unit signals by accumulating signals representing the widths of N successive square wave pulses with successive accumulating steps beginning with successive square wave pulses;

extracting pairs of basic unit signals from the generated series, said pairs representing potential contiguous but non-characters; and comparing the relative widths of each presented pair to determine whether the relative widths fall within predetermined limits indicative of possible combinations of data, margin and center characters.

* * * * *